(12) United States Patent
Gao

(10) Patent No.: US 12,507,214 B2
(45) Date of Patent: Dec. 23, 2025

(54) UCI COMBINED TRANSMISSION METHOD, TERMINAL, AND NETWORK DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/587,803

(22) Filed: Feb. 26, 2024

(65) Prior Publication Data
US 2024/0260004 A1    Aug. 1, 2024

Related U.S. Application Data

(63) Continuation of application No. 17/267,460, filed as application No. PCT/CN2019/097371 on Jul. 23, 2019, now Pat. No. 11,937,212.

(30) Foreign Application Priority Data

Aug. 13, 2018  (CN) .......................... 201810918467.2

(51) Int. Cl.
    *H04W 72/02*    (2009.01)
    *H04L 1/1812*   (2023.01)
    (Continued)

(52) U.S. Cl.
    CPC ........... *H04W 72/02* (2013.01); *H04L 1/1819* (2013.01); *H04L 1/1896* (2013.01);
    (Continued)

(58) Field of Classification Search
    CPC . H04W 72/02; H04W 72/0446; H04W 72/54; H04W 72/21; H04L 1/1819; H04L 1/1896
    See application file for complete search history.

(56) References Cited

U.S. PATENT DOCUMENTS

11,937,212 B2 *  3/2024  Gao .................. H04W 72/02
2018/0302895 A1 * 10/2018  Akkarakaran ........ H04W 72/23
2019/0045498 A1 *  2/2019  Huang ............... H04W 72/541

OTHER PUBLICATIONS

Ericsson, "Summary of Discussions on Multiplexing Different UGI types on a PUCCH resource", 3GPP TSG RAN WG1 Meeting AH 1801, Vancouver, Canada, Jan. 22-26, 2018, total 27 pages, R1-1801262.
(Continued)

*Primary Examiner* — Brenda H Pham
(74) *Attorney, Agent, or Firm* — KILPATRICK TOWNSEND & STOCKTON LLP

(57) ABSTRACT

Disclosed are a UCI combined transmission method, a terminal, and a network device. The method comprises: when determining that a transmission resource of a first UCI overlaps transmission resources of a plurality of second UCIs in a time domain, a terminal selects the transmission resource of one second UCI from the transmission resources of the plurality of second UCIs according to an initial position of the transmission resource of the first UCI and the initial position of the transmission resources of the second UCIs, so as to simultaneously transmit the first UCI and the selected second UCI on the transmission resource of the selected second UCI. Accordingly, a network can also simultaneously receive the first UCI and the selected second UCI on the transmission resource of the selected second UCI with the same method.

20 Claims, 9 Drawing Sheets

(51) Int. Cl.
*H04L 1/1867* (2023.01)
*H04W 72/0446* (2023.01)
*H04W 72/21* (2023.01)
*H04W 72/54* (2023.01)

(52) U.S. Cl.
CPC ....... *H04W 72/0446* (2013.01); *H04W 72/21* (2023.01); *H04W 72/54* (2023.01)

(56) References Cited

OTHER PUBLICATIONS

CATT, "On UCI multiplexing on Pucch", 3GPP TSG RAN WG1 Meeting #93, Busan, Korea, May 21-25, 2018, total 7 pages, R1-1806293.

Ericsson, "On UCI Multiplexing on PUCCH", 3GPP TSG RAN WG1 Meeting#93, Busan, South Korea, May 21-25, 2018, total 9 pages, R1-1807251.

* cited by examiner

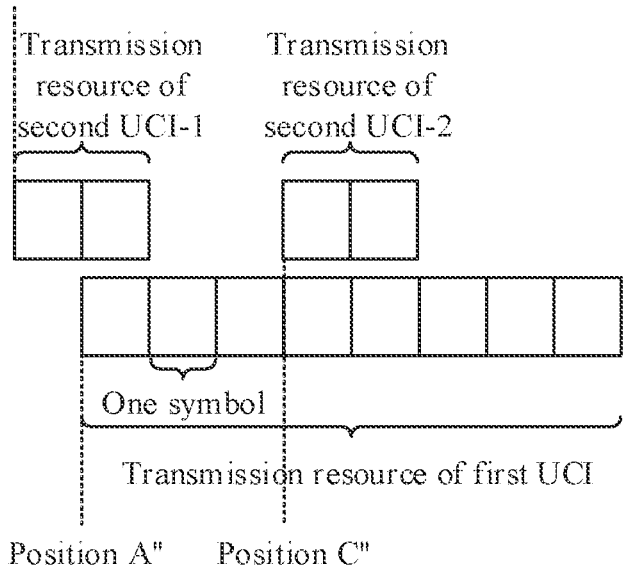

Fig. 4C

```
                                                    ┌─501
┌─────────────────────────────────────────────────┐
│ The base station determines that a transmission  │
│ resource of the first UCI and transmission       │
│ resources of a plurality of second UCIs overlap  │
│ in the time domain, and transmission resources   │
│ of any two of the plurality of second UCIs do    │
│ not overlap in the time domain                   │
└─────────────────────────────────────────────────┘
                        │
                        ▼                        ┌─502
┌─────────────────────────────────────────────────┐
│ The base station selects a transmission resource │
│ of a second UCI among the transmission resources │
│ of the plurality of second UCIs according to the │
│ start position of the transmission resource of   │
│ the first UCI and the start positions of the     │
│ transmission resources of the second UCIs        │
└─────────────────────────────────────────────────┘
                        │
                        ▼                        ┌─503
┌─────────────────────────────────────────────────┐
│ The base station receives the first UCI and the  │
│ second UCI carried by the selected transmission  │
│ resource of the second UCI simultaneously on the │
│ selected transmission resource of the second UCI │
└─────────────────────────────────────────────────┘
```

Fig. 5

UCI COMBINED TRANSMISSION METHOD, TERMINAL, AND NETWORK DEVICE

The application is a continuation of U.S. patent application Ser. No. 17/267,460, filed on Feb. 9, 2021, which is a US National Stage of International Application No. PCT/CN2019/097371, filed Jul. 23, 2019. The International application claims priority to Chinese Patent Application No. 201810918467.2, filed with the China National Intellectual Property Administration on Aug. 13, 2018. The aforementioned patent applications are hereby incorporated by reference in their entireties.

FIELD

The application relates to the field of terminal technology, and in particular to a UCI combined transmission method, a user equipment and a network-side device.

BACKGROUND

With the development change of the mobile communication service demand, the International Telecommunication Union (ITU), the 3rd Generation Partnership Project (3GPP) and other organizations all begin to research new wireless communication systems, e.g., 5 Generation New Radio Access Technology (5G NR).

In the current 5G NR system, the Uplink Control Information (UCI) can be transmitted using the NR Physical Uplink Control CHannel (PUCCH). The NR PUCCH formats include 5 types of PUCCH formats: format 0, format 1, format 2, format 3 and format 4, wherein the PUCCH format 0 or 1 may carry 1 bit to 2 bits UCI, and the PUCCH format 2, 3 or 4 may carry the UCI greater than 2 bits; the PUCCH format 0 or 2 are the short PUCCH and may occupy 1 symbol to 2 symbols for transmission, and the PUCCH format 1, 3 or 4 are the long PUCCH and may occupy 4 to 14 symbols for transmission.

The UCI may be a Hybrid Automatic Repeat reQuest-Acknowledgement (HARQ-ACK), which can be transmitted using the NR PUCCH format 0 or 1 or 2 or 3 or 4; or the UCI may be a Scheduling Request (SR), which can be transmitted using the NR PUCCH format 0 or 1; or the UCI may be the periodic Channel State Information (CSI), which can be transmitted using the NR PUCCH format 2 or 3 or 4.

In the 5G NR system, the PUCCH formats used by transmission resources of different UCIs are independently configured, so the transmission resources of different UCIs may overlap in the time domain, but a user equipment can only transmit one PUCCH at an uplink moment on a carrier. There is a need to solve the problem of how to transmit UCIs.

SUMMARY

The embodiments of the application provide a UCI combined transmission method, a user equipment and a network-side device, so as to solve the technical problem of how to transmit UCIs when the transmission resources of different UCIs overlap in the time domain.

On the user equipment side, a UCI combined transmission method according to an embodiment of the application includes:

determining, by a user equipment, that a transmission resource of a first UCI and transmission resources of a plurality of second UCIs overlap in the time domain, and transmission resources of any two of the plurality of second UCIs do not overlap in the time domain;

selecting, by the user equipment, a transmission resource of a second UCI among the transmission resources of the plurality of second UCIs according to a start position of the transmission resource of the first UCI and start positions of the transmission resources of the second UCIs;

transmitting, by the user equipment, the first UCI and the second UCI carried by the selected transmission resource of the second UCI simultaneously on the selected transmission resource of the second UCI.

In the embodiment of the application, when determining that the transmission resource of the first UCI and the transmission resources of a plurality of second UCIs overlap in the time domain and the transmission resources of any two of the plurality of second UCIs do not overlap in the time domain, the user equipment can select the transmission resource of a second UCI among the transmission resources of the plurality of second UCIs according to the start position of the transmission resource of the first UCI and the start positions of the transmission resources of the second UCIs, and then transmit the first UCI and the second UCI carried by the selected transmission resource of the second UCI simultaneously on the selected transmission resource of the second UCI. The above method provides a solution of how to transmit UCIs when transmission resources of different UCIs overlap in the time domain, and can avoid the redundant transmission of the first UCI.

Therefore, on the network side, for example, on the base station side, the above method can ensure that the base station and the user equipment have the same understanding of UCI combined transmission when the transmission resources of different UCIs overlap in the time domain; and the above method can also avoid the redundant transmission of the first UCI while ensuring that the base station can obtain the UCI timely.

In a possible implementation, selecting, by the user equipment, the transmission resource of a second UCI among the transmission resources of the plurality of second UCIs according to a start position of the transmission resource of the first UCI and start positions of the transmission resources of the plurality of second UCIs, includes: when the user equipment determines that the start position of the transmission resource of the first UCI is not later than a start position of the transmission resource of any second UCI or a first second UCI or a second UCI with an earliest start position among the transmission resources of the plurality of second UCIs, then determining the transmission resource of the first second UCI or the second UCI with the earliest start position among the transmission resources of the plurality of second UCIs as the selected transmission resource of the second UCI.

In a possible implementation, selecting, by the user equipment, the transmission resource of a second UCI among the transmission resources of the plurality of second UCIs according to the start position of the transmission resource of the first UCI and start positions of the transmission resources of the plurality of second UCIs, includes: when the user equipment determines that the start position of the transmission resource of the first UCI is later than a start position of the transmission resource of a first second UCI or a second UCI with an earliest start position among the transmission resources of the plurality of second UCIs, then determining transmission resource of a second or last second UCI or a second UCI with a second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: Hybrid Automatic Repeat reQuest-Acknowledgement (HARQ-ACK), periodic Channel State Information (CSI) and Scheduling Request (SR).

In a possible implementation, the first UCI is SR, and the plurality of second UCIs are HARQ-ACKs; or the first UCI is SR, and the plurality of second UCIs are Semi-Persistent Scheduling (SPS) HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, before the user equipment selects the transmission resource of a second UCI among the transmission resources of the plurality of second UCIs according to the start position of the transmission resource of the first UCI and the start positions of the transmission resources of the second UCIs, the method further includes: determining, by the user equipment, whether simultaneous transmission of the first UCI and the second UCI is supported; and selecting, by the user equipment, the transmission resource of a second UCI among the transmission resources of the plurality of second UCIs according to the start position of the transmission resource of the first UCI and the start positions of the transmission resources of the second UCIs when the simultaneous transmission of the first UCI and the second UCI is supported.

Correspondingly, on the network side, a UCI combined transmission method according to an embodiment of the application includes:

determining, by a network-side device, that a transmission resource of a first UCI and transmission resources of a plurality of second UCIs overlap in a time domain, and transmission resources of any two of the plurality of second UCIs do not overlap in the time domain;

selecting, by the network-side device, a transmission resource of a second UCI among the transmission resources of the plurality of second UCIs according to a start position of the transmission resource of the first UCI and start positions of the transmission resources of the second UCIs;

receiving, by the network-side device, the first UCI and the second UCI carried by the selected transmission resource of the second UCI simultaneously on the selected transmission resource of the second UCI.

Therefore, on the network side, for example, on the base station side, the above method can ensure that the base station and the user equipment have the same understanding of UCI combined transmission when the transmission resources of different UCIs overlap in the time domain; and the above method can also avoid the redundant transmission of the first UCI while ensuring that the base station can obtain the UCI timely.

In a possible implementation, selecting, by the network-side device, the transmission resource of a second UCI among the transmission resources of the plurality of second UCIs according to the start position of the transmission resource of the first UCI and start positions of the transmission resources of the plurality of second UCIs, includes: when the network-side device determines that the start position of the transmission resource of the first UCI is not later than a start position of a transmission resource of any second UCI or a first second UCI or a second UCI with an earliest start position among the transmission resources of the plurality of second UCIs, then determining the transmission resource of the first second UCI or the second UCI with the earliest start position among the transmission resources of the plurality of second UCIs as the selected transmission resource of the second UCI.

In a possible implementation, selecting, by the network-side device, the transmission resource of a second UCI among the transmission resources of the plurality of second UCIs according to the start position of the transmission resources of the first UCI and the start positions of the transmission resources of the plurality of second UCIs, includes: when the network-side device determines that the start position of the transmission resource of the first UCI is later than a start position of transmission resource of a first second UCI or a second UCI with an earliest start position among the transmission resources of the plurality of second UCIs, then determining the transmission resource of a second or last second UCI or a second UCI with a second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: HARQ-ACK, periodic CSI and SR.

In a possible implementation, the first UCI is SR, and the plurality of second UCIs are HARQ-ACKs; or the first UCI is SR, and the plurality of second UCIs are SPS HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, before the network-side device selects the transmission resource of a second UCI among the transmission resources of the plurality of second UCIs according to the start position of the transmission resource of the first UCI and the start positions of the transmission resources of the second UCIs, the method further includes: determining, by the network-side device, whether simultaneous transmission of the first UCI and the second UCI is supported; and selecting, by the network-side device, the transmission resource of a second UCI among the transmission resources of the plurality of second UCIs according to the start position of the transmission resource of the first UCI and the start positions of the transmission resources of the second UCIs when the simultaneous transmission of the first UCI and the second UCI is supported.

Based on the same inventive concept, a user equipment according to an embodiment of the application includes:
- a determining unit configured to determine that a transmission resource of a first UCI and transmission resources of a plurality of second UCIs overlap in a time domain, and transmission resources of any two of the plurality of second UCIs do not overlap in the time domain;
- a selection unit configured to select a transmission resource of a second UCI among the transmission resources of the plurality of second UCIs according to a start position of the transmission resource of the first UCI and start positions of the transmission resources of the second UCIs;
- a transmission unit configured to transmit the first UCI and the second UCI carried by the selected transmission resource of the second UCI simultaneously on the selected transmission resource of the second UCI.

Based on the same inventive concept, a network-side device according to an embodiment of the application includes:
- a determining unit configured to determine that a transmission resource of a first UCI and transmission resources of a plurality of second UCIs overlap in the time domain, and transmission resources of any two of the plurality of second UCIs do not overlap in the time domain;
- a selection unit configured to select transmission resources of a second UCI among the transmission resources of the plurality of second UCIs according to a start position of the transmission resource of the first UCI and start positions of the transmission resources of the second UCIs;
- a receiving unit configured to receive the first UCI and the second UCI carried by the selected transmission resource of the second UCI simultaneously on the selected transmission resource of the second UCI.

Based on the same inventive concept, an embodiment of the application further provides a network device, which may be a user equipment or a network-side device and has the function of implementing the UCI combined transmission method described above. This function can be implemented by executing the corresponding software by hardware. In a possible design, the network device includes: a processor, a transceiver, and a memory; the memory is configured to store computer executive instructions, the transceiver is configured to implement the communications between the network device and other communication entities, and the processor and the memory are connected through the bus. When the network device runs, the processor executes the computer executive instructions stored in the memory to cause the network device to perform the UCI combined transmission method described above.

Based on the same inventive concept, an embodiment of the application further provides a computer storage medium in which a software program is stored, where the software program, when being read and executed by one or more processors, implements the UCI combined transmission method described in various possible implementations described above.

An embodiment of the application further provides a computer program product containing instructions, where the computer program product, when running on a computer, cause the computer to perform the UCI combined transmission method described in various possible implementations described above.

BRIEF DESCRIPTION OF THE DRAWINGS

In order to illustrate the technical solutions in the embodiments of the application more clearly, the accompanying figures which need to be used in describing the embodiments will be introduced below briefly.

FIG. 4C is an example where the start position of the transmission resource of the first UCI is later than the start position of the transmission resources of the second UCIs according to an embodiment of the application;

FIG. 5 is a flow schematic diagram corresponding to another UCI combined transmission method according to an embodiment of the application;

DETAILED DESCRIPTION

The application will be illustrated below in combination with the drawings of the specification, and the operation methods according to the method embodiments may also be applied in the device embodiments.

Figure 1:
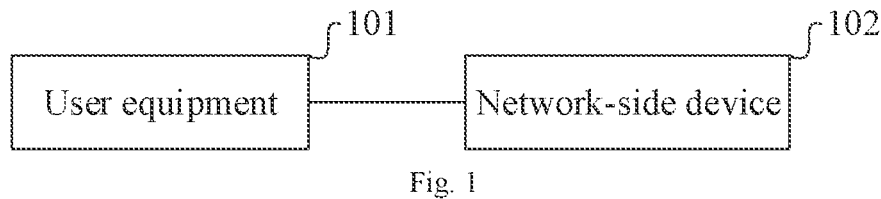
FIG. 1 is a schematic diagram of a system for transmitting the UCI according to an embodiment of the application.

As shown in FIG. 1, an embodiment of the application provides a system for transmitting the UCI, which includes: a user equipment 101 and a network-side device 102.

The user equipment 101 is configured to: when determining that a transmission resource of a first UCI and transmission resources of a plurality of second UCIs overlap in a time domain and transmission resources of any two of the plurality of second UCIs do not overlap in the time domain, select a transmission resource of a second UCI among the transmission resources of the plurality of second UCIs, and transmit the first UCI and the second UCI carried by the selected transmission resource of the second UCI simultaneously on the selected transmission resource of the second UCI. The user equipment can be a variety of types of user equipments, such as notebook computer, smart phone, tablet computer, smart TV, and so on.

The network-side device 102 is configured to: when determining that the transmission resource of the first UCI and the transmission resources of a plurality of second UCIs overlap in the time domain and the transmission resources of any two of the plurality of second UCIs do not overlap in the time domain, select a transmission resource of a second UCI among the transmission resources of the plurality of second UCIs, and receive the first UCI and the second UCI carried by the selected transmission resource of the second UCI simultaneously on the selected transmission resource of the second UCI.

In this way, when the transmission resources of a plurality of second UCIs and the transmission resource of the first UCI overlap in the time domain, the user equipment can select a transmission resource of a second UCI among the transmission resources of the plurality of second UCIs according to the start position of the transmission resource of the first UCI and the start positions of the transmission resources of the second UCIs, and then transmit the first UCI and the second UCI carried by the selected transmission resource of the second UCI simultaneously on the selected transmission resource of the second UCI. Correspondingly, the network side can also use the same method to receive the first UCI and the second UCI carried by the selected transmission resource of the second UCI simultaneously on the selected transmission resource of the second UCI. The above method can ensure that the base station and the user equipment have the same understanding of UCI combined transmission when the transmission resources of different UCIs overlap in the time domain; and the above method can also avoid the redundant transmission of the first UCI while ensuring that the base station can obtain the UCI timely.

Figure 2:
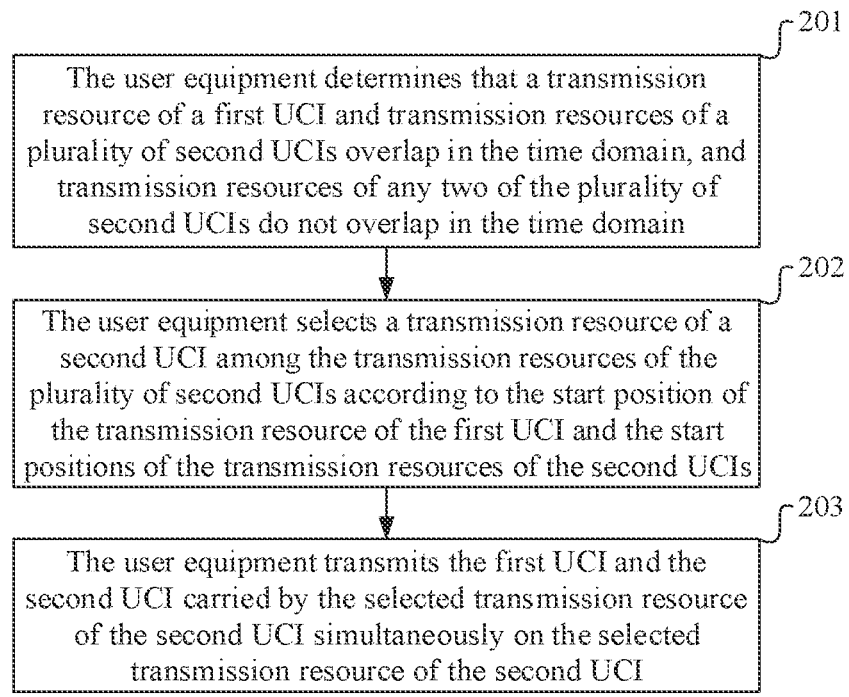
FIG. 2 is a flow schematic diagram corresponding to a UCI combined transmission method according to an embodiment of the application.

As shown in FIG. 2, it is a flow schematic diagram corresponding to a UCI combined transmission method according to an embodiment of the application. This method can be performed by a user equipment and includes the following steps.

Step 201: the user equipment determines that a transmission resource of a first UCI and transmission resources of a plurality of second UCIs overlap in the time domain, and transmission resources of any two of the plurality of second UCIs do not overlap in the time domain.

In the embodiment of the application, the transmission resource may be PUCCH resource, that is, the transmission resource of the first UCI may be PUCCH resource used by the first UCI, and the transmission resource of the second UCI may be PUCCH resource used by the second UCI.

Since the transmission resource of the first UCI and the transmission resources of the plurality of second UCIs are independently configured, the transmission resource of the first UCI and the transmission resources of the plurality of second UCIs may overlap in the time domain. For example, for the first UCI, when the number of symbols occupied by the transmission resource of the first UCI is large, a plurality of second UCIs may be transmitted within the time domain range of the first UCI transmission. This case is that the transmission resource of the first UCI and the transmission resources of a plurality of second UCIs overlap in the time domain. For the plurality of second UCIs, the transmission resources of any two of the plurality of second UCIs need to meet the condition of non-overlapping in the time domain.

Figure 3A:
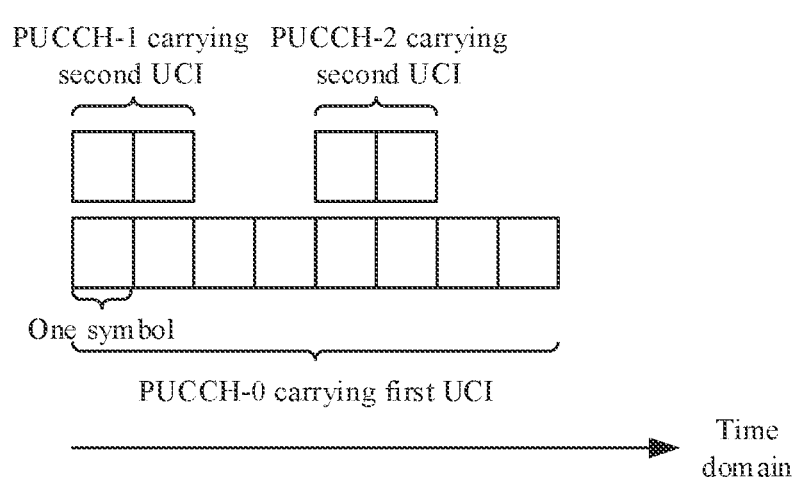
FIG. 3A is one of schematic diagrams where a transmission resource of a first UCI and transmission resources of a plurality of second UCIs overlap in the time domain according to an embodiment of the application.

There are many cases where the transmission resource of the first UCI and the transmission resources of a plurality of second UCIs overlap in the time domain. One case is that the transmission resource of the first UCI and the transmission resources of a plurality of second UCIs overlap completely in the time domain. As shown in FIG. 3A, it is one of schematic diagrams where the transmission resource of the first UCI and the transmission resources of a plurality of second UCIs overlap in the time domain according to an embodiment of the application. The transmission resource of the first UCI is PUCCH-0, which occupies 8 symbols; the transmission resource of one of two second UCIs is PUCCH-1, which occupies 2 symbols, and the transmission resource of the other second UCI is PUCCH-1, which occupies 2 symbols. It can be seen from FIG. 3A that the transmission resource (PUCCH-0) of the first UCI overlaps completely with the transmission resources (PUCCH-1, PUCCH-2) of the two second UCIs.

Figure 3B:
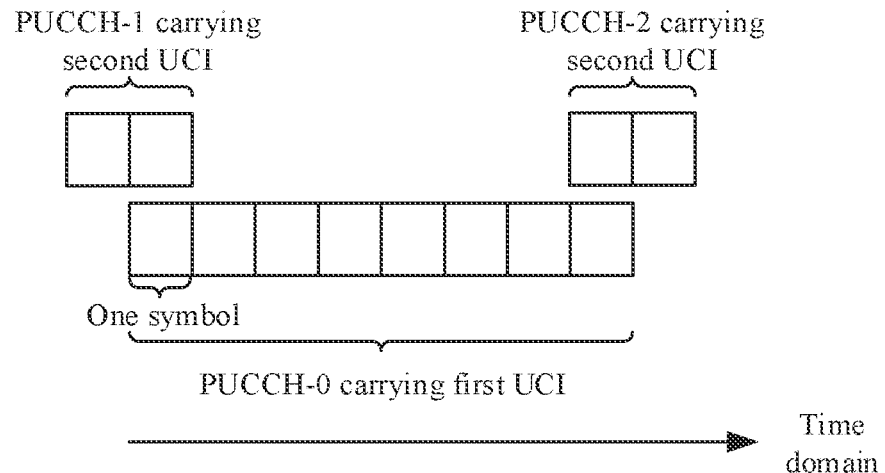
FIG. 3B is a second one of schematic diagrams where a transmission resource of a first UCI and transmission resources of a plurality of second UCIs overlap in the time domain according to an embodiment of the application.

Another case is that the transmission resource of the first UCI and the transmission resources of a plurality of second UCIs overlap partially in the time domain. As shown in FIG. 3B, it is a second one of schematic diagrams where the transmission resource of the first UCI and the transmission resources of a plurality of second UCIs overlap in the time domain according to an embodiment of the application. The transmission resource of the first UCI is PUCCH-0, which occupies 8 symbols; the transmission resource of one of two second UCIs is PUCCH-1, which occupies 2 symbols, and the transmission resource of the other second UCI is PUCCH-1, which occupies 2 symbols. It can be seen from FIG. 3B that the transmission resource (PUCCH-0) of the first UCI overlaps partially with the transmission resources (PUCCH-1, PUCCH-2) of the two second UCIs.

Figure 3C:
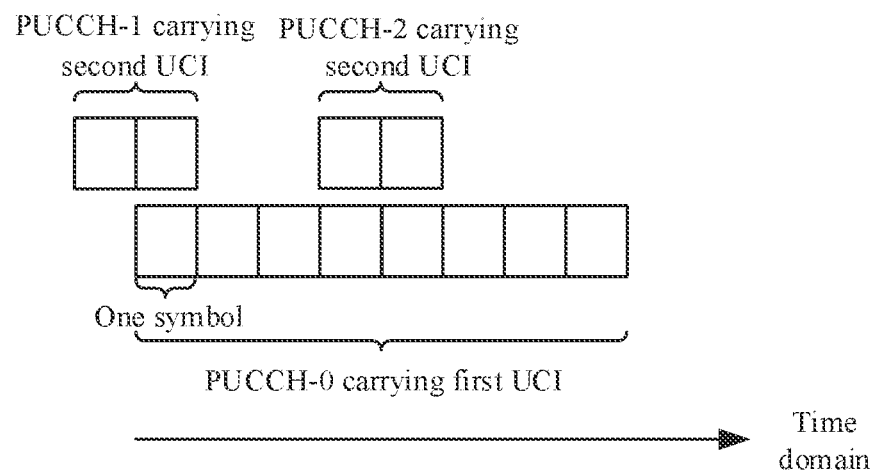
FIG. 3C is a third one of schematic diagrams where a transmission resource of a first UCI and transmission resources of a plurality of second UCIs overlap in the time domain according to an embodiment of the application.

Another case is that the transmission resource of the first UCI overlap completely with the transmission resources of some second UCIs in the time domain, and overlap partially with the transmission resources of some second UCIs in the time domain. As shown in FIG. 3C, it is a third one of schematic diagrams where the transmission resource of the first UCI and the transmission resources of a plurality of second UCIs overlap in the time domain according to an embodiment of the application. The transmission resource of the first UCI is PUCCH-0, which occupies 8 symbols; the transmission resource of one of two second UCIs is PUCCH-1, which occupies 2 symbols, and the transmission resource of the other second UCI is PUCCH-1, which occupies 2 symbols. It can be seen from FIG. 3C that the transmission resource (PUCCH-0) of the first UCI overlaps partially with the transmission resource (PUCCH-1) of a second UCI, and overlaps completely with the transmission resource (PUCCH-2) of the other second UCI.

Step 202: the user equipment selects a transmission resource of a second UCI among the transmission resources of the plurality of second UCIs according to a start position of the transmission resource of the first UCI and start positions of the transmission resources of the second UCIs.

In an embodiment of the application, the methods of selecting transmission resource of a second UCI according to the relationship between the start position of the transmission resource of the first UCI and the start positions of the transmission resources of the second UCIs may include the following two methods.

First method: when the user equipment determines that the start position of the transmission resource of the first UCI is not later than the start position of a transmission resource of any second UCI or a first second UCI or a second UCI with the earliest start position among the transmission resources of the plurality of second UCIs, then the user equipment determines the transmission resource of the first second UCI or the second UCI with the earliest start position among the transmission resources of the plurality of second UCIs as the selected transmission resource of the second UCI.

Figure 4A:
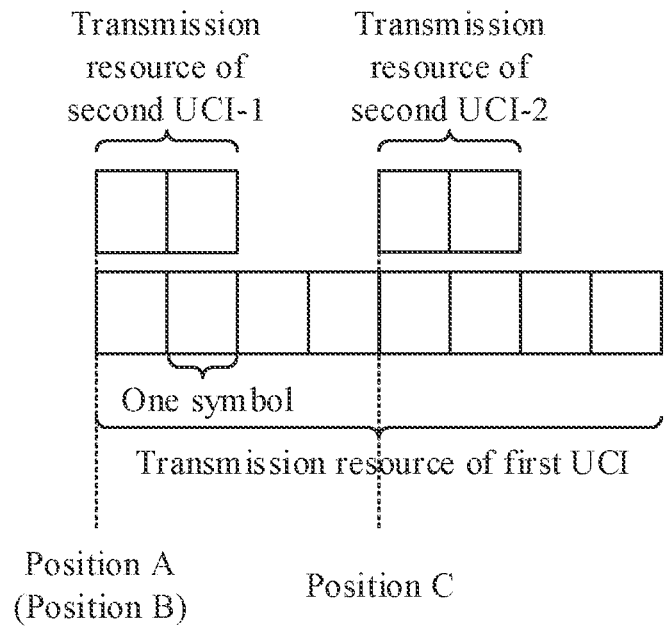
FIG. 4A is one of examples where a start position of the transmission resource of the first UCI is not later than the start position of the transmission resources of the second UCIs according to an embodiment of the application.

Specifically, as shown in FIG. 4A, it is one of examples where the start position of the transmission resource of the first UCI is not later than the start positions of the transmission resources of the second UCIs according to an embodiment of the application. The start position of the transmission resource of the first UCI is the position A shown in FIG. 4A, the start position of the transmission resource of the second UCI-1 is the position B shown in FIG. 4A, and the starting position of the transmission resource of the second UCI-2 is the position C shown in FIG. 4A. It can be seen from FIG. 4A that the start position (position A) of the transmission resource of the first UCI is aligned with the start position (position B) of the transmission resource of the second UCI-1, the start position (position A) of the transmission resource of the first UCI is earlier than the start position (position C) of the transmission resource of the second UCI-2, and the start position (position B) of the transmission resource of the second UCI-1 is earlier than the starting position (position C) of the transmission resource of the second UCI-2. That is, the start position of the transmission resource of the first UCI is no later than the start position of the transmission resource of any one of the second UCI-1 and the second UCI-2, or it can also be regarded as: the starting position of the transmission resource of the first UCI is no later than the start position of the transmission resource of the first second UCI (i.e., second UCI-1), or it can also be regarded as: the start position of the transmission resource of the first UCI no later than the start position of the transmission resource of the second UCI with the earliest start position (i.e., second UCI-1). In this way, the user equipment can determine the transmission resource of the first second UCI among the transmission resources of these two second UCIs (or the transmission resource of the second UCI with the earliest start position among the transmission resources of these two second UCIs), i.e., the transmission resource of the second UCI-1, as the selected transmission resource of the second UCI.

Figure 4B:
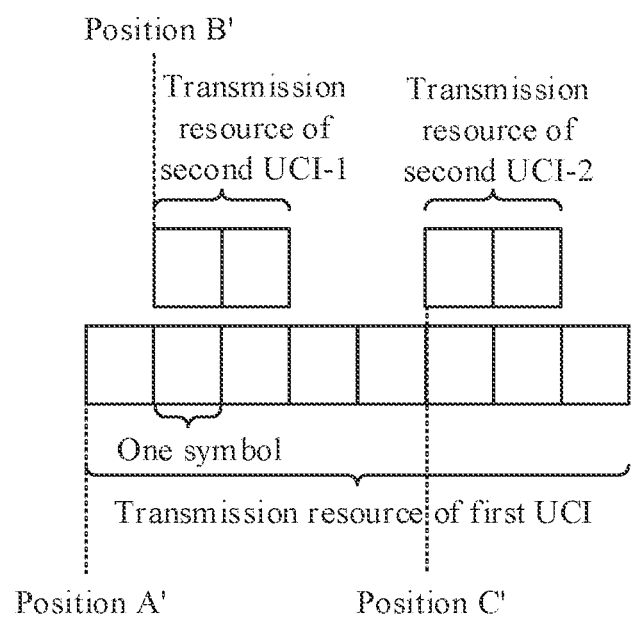
FIG. 4B is a second one of examples where the start position of the transmission resource of the first UCI is not later than the start position of the transmission resources of the second UCIs according to an embodiment of the application.

As shown in FIG. 4B, it is a second one of examples where the start position of the transmission resource of the first UCI is not later than the start positions of the transmission resources of the second UCIs according to an embodiment of the application. The start position of the transmission resource of the first UCI is the position A' shown in FIG. 4B, the start position of the transmission resource of the second UCI-1 is the position B' shown in FIG. 4B, and the starting position of the transmission resource of the second UCI-2 is the position C' shown in FIG. 4B. It can be seen from FIG. 4B that the start position (position A') of the transmission resource of the first UCI is earlier than the start position (position B') of the transmission resource of the second UCI-1, the start position (position A') of the transmission resource of the first UCI is earlier than the start position (position C') of the transmission resource of the second UCI-2, and the start position (position B') of the transmission resource of the second UCI-1 is earlier than the starting position (position C') of the transmission resource of the second UCI-2. That is, the start position of the transmission resource of the first UCI is no later than the start position of the transmission resource of any one of the second UCI-1 and the second UCI-2, or it can also be regarded as: the starting position of the transmission resource of the first UCI is no later than the start position of the transmission resource of the first second UCI (i.e., second UCI-1), or it can also be regarded as: the start position of the transmission resource of the first UCI no later than the start position of the transmission resource of the second UCI with the earliest start position (i.e., second UCI-1). In this way, the user equipment can determine the transmission resource of the first second UCI among the transmission resources of these two second UCIs (or the transmission resource of the second UCI with the earliest start position among the transmission resources of these two second UCIs), i.e., the transmission resource of the second UCI-1, as the selected transmission resource of the second UCI.

Second method: when the user equipment determines that the start position of the transmission resource of the first UCI is later than the start position of transmission resource of a first second UCI or a second UCI with the earliest start position among the transmission resources of the plurality of second UCIs, then the user equipment determines transmission resource of a second or last second UCI or a second UCI with the second earliest start position among the transmission resources of the plurality of second UCIs as the selected transmission resource of the second UCI.

Specifically, as shown in FIG. 4C, it is an example where the start position of the transmission resource of the first UCI is later than the start position of the transmission resources of the second UCIs according to an embodiment of the application. The start position of the transmission resource of the first UCI is the position A" shown in FIG. 4C, the start position of the transmission resource of the second UCI-1 is the position B" shown in FIG. 4C, and the starting position of the transmission resource of the second UCI-2 is the position C" shown in FIG. 4C. It can be seen from FIG. 4C that the start position (position A") of the transmission resource of the first UCI is later than the start position (position B") of the transmission resource of the second UCI-1, the start position (position A") of the transmission resource of the first UCI is earlier than the start position (position C") of the transmission resource of the second UCI-2, and the start position (position B") of the transmission resource of the second UCI-1 is earlier than the starting position (position C") of the transmission resource of the second UCI-2. That is, the start position of the transmission resource of the first UCI is later than the start position of the transmission resource of the first second UCI (i.e., second UCI-1), or it can also be regarded as: the start position of the transmission resource of the first UCI is later than the start position of the transmission resource of the second UCI with the earliest start position (i.e., second UCI-1). In this way, the user equipment can determine the transmission resource of the second UCI among the transmission resources of these two second UCIs (or the transmission resource of the last UCI among the transmission resources of these two second UCIs, or the transmission resource of the second UCI with the second earliest start position among the transmission resources of these two second UCIs), i.e., the transmission resource of the second UCI-2, as the selected transmission resource of the second UCI.

In an embodiment of the application, the first UCI and the plurality of second UCIs are any one of: Hybrid Automatic Repeat reQuest-Acknowledgement (HARQ-ACK), periodic Channel State Information (CSI) and Scheduling Request (SR).

Further, the plurality of second UCIs may include second UCIs of the same message type, for example, the plurality of second UCIs are all HARQ-ACKs, or the plurality of second UCIs are all CSIs, or the plurality of second UCIs are all SRs; or the plurality of second UCIs may include second UCIs of at least two different message types, for example, at least one of the plurality of second UCIs is HARQ-ACK, and at least one is CSI; or at least one of the plurality of second UCIs is HARQ-ACK, and at least one is SR; or at least one of the plurality of second UCIs is CSI, and at least one is SR; or at least one of the plurality of second UCIs is HARQ-ACK, at least one is CSI, and at least one is SR, which are not specifically limited.

Furthermore, in order to more clearly illustrate the combinations of the first UCI and the plurality of second UCIs, examples will be given below for illustration. It should be noted that the examples given below are only illustrative, and the combinations of the first UCI and the plurality of second UCIs include but not limited to the following examples. Those skilled in the art can determine the combinations of the first UCI and the plurality of second UCIs according to the experience and actual situation, which are not specifically limited.

Example 1: the first UCI is SR, and the plurality of second UCIs are HARQ-ACKs.

Example 2: the first UCI is SR, and the plurality of second UCIs are SPS HARQ-ACKs.

Example 3: the first UCI is SR, and the plurality of second UCIs are CSIs.

Example 4: the first UCI is SR, at least one of the plurality of second UCIs is CSI, and at least one of the plurality of second UCIs is HARQ-ACK.

Example 5: the first UCI is SR, at least one of the plurality of second UCIs is CSI, and at least one of the plurality of second UCIs is SPS HARQ-ACK.

Example 6: the first UCI is positive SR, and the plurality of second UCIs are HARQ-ACKs.

Example 7: the first UCI is positive SR, and the plurality of second UCIs are SPS HARQ-ACKs.

Example 8: the first UCI is positive SR, and the plurality of second UCIs are CSIs.

Example 9: the first UCI is positive SR, at least one of the plurality of second UCIs is CSI, and at least one of the plurality of second UCIs is HARQ-ACK.

Example 10: the first UCI is positive SR, at least one of the plurality of second UCIs is CSI, and at least one of the plurality of second UCIs is SPS HARQ-ACK.

Example 11: the first UCI is CSI, and the plurality of second UCIs are HARQ-ACKs.

Example 12: the first UCI is CSI, and the plurality of second UCIs are SPS HARQ-ACKs.

Example 13: the first UCI is CSI, at least one of the plurality of second UCIs is HARQ-ACK, and at least one of the plurality of second UCIs is SR.

Example 14: the first UCI is CSI, at least one of the plurality of second UCIs is HARQ-ACK, and at least one of the plurality of second UCIs is positive SR.

Example 15: the first UCI is CSI, at least one of the plurality of second UCIs is SPS HARQ-ACK, and at least one of the plurality of second UCIs is SR.

Example 16: the first UCI is CSI, at least one of the plurality of second UCIs is SPS HARQ-ACK, and at least one of the plurality of second UCIs is positive SR.

Example 17: the first UCI is HARQ-ACK, and the plurality of second UCIs are SRs.

Example 18: the first UCI is HARQ-ACK, and the plurality of second UCIs are positive SRs.

Example 19: the first UCI is HARQ-ACK, at least one of the plurality of second UCIs is CSI, and at least one of the plurality of second UCIs is SR.

Example 20: the first UCI is HARQ-ACK, at least one of the plurality of second UCIs is CSI, and at least one of the plurality of second UCIs is positive SR.

Example 21: the first UCI is SPS HARQ-ACK, and the plurality of second UCIs are SRs.

Example 22: the first UCI is SPS HARQ-ACK, and the plurality of second UCIs are positive SRs.

Example 23: the first UCI is SPS HARQ-ACK, at least one of the plurality of second UCIs is CSI, and at least one of the plurality of second UCIs is SR.

Example 24: the first UCI is SPS HARQ-ACK, at least one of the plurality of second UCIs is CSI, and at least one of the plurality of second UCIs is positive SR.

It should be noted that, before performing the step 202, the user equipment may further determine whether simultaneous transmission of the first UCI and the second UCIs is supported; and the user equipment selects a transmission resource of a second UCI among the transmission resources of the plurality of second UCIs according to the start position of the transmission resource of the first UCI and the start positions of the transmission resources of the second UCIs when the simultaneous transmission of the first UCI and the second UCIs is supported.

Step 203: the user equipment transmits the first UCI and the second UCI carried by the selected transmission resource of the second UCI simultaneously on the selected transmission resource of the second UCI.

In the embodiment of the application, according to different message types of the first UCI and the second UCI, the user equipment may use different modes for transmission on the selected transmission resource of the second UCI. The transmission modes can also refer to the method provided in the prior art, and will not be described in detail here.

Since the network-side device needs to receive the first UCI and/or the second UCI on the PUCCH resources, the network-side device also needs to select transmission resource of a second UCI among the transmission resources of the plurality of second UCIs and receive the second UCI and the first UCI on the selected transmission resource of the second UCI according to the user equipment-side method.

As shown in FIG. 5, it is a flow schematic diagram corresponding to another UCI combined transmission method according to an embodiment of the application. This method can be performed by a network-side device (such as base station), and includes the following steps.

Step 501: the base station determines that a transmission resource of the first UCI and transmission resources of a plurality of second UCIs overlap in the time domain, and transmission resources of any two of the plurality of second UCIs do not overlap in the time domain.

The transmission resource may be PUCCH resource, that is, the transmission resource of the first UCI may be PUCCH resource used by the first UCI, and the transmission resource of the second UCI may be PUCCH resource used by the second UCI.

It should be noted that the method for the base station to determine whether the transmission resource of the first UCI and the transmission resources of the plurality of second UCIs overlap in the time domain may refer to the content described on the user equipment side above, and will not be described in detail here.

Step 502: the base station selects a transmission resource of a second UCI among the transmission resources of the plurality of second UCIs according to the start position of the transmission resource of the first UCI and the start positions of the transmission resources of the second UCIs.

In an embodiment of the application, when the base station determines that the start position of the transmission resource of the first UCI is not later than the start position of transmission resource of any second UCI or a first second UCI or a second UCI with the earliest start position among the transmission resources of the plurality of second UCIs, then the base station determines the transmission resource of the first second UCI or the second UCI with the earliest start position among the transmission resources of the plurality of second UCIs as the selected transmission resource of the second UCI; when the base station determines that the start position of the transmission resource of the first UCI is later than the start position of transmission resource of a first second UCI or a second UCI with the earliest start position among the transmission resources of the plurality of second UCIs, then the base station determines the transmission resource of a second or last second UCI or a second UCI with the second earliest start position among the transmission resources of the plurality of second UCIs as the selected transmission resources of the second UCI.

Further, the first UCI and the plurality of second UCIs are any one of: Hybrid Automatic Repeat reQuest-Acknowledgement (HARQ-ACK), periodic Channel State Information (CSI) and Scheduling Request (SR). For the plurality of second UCIs, the plurality of second UCIs may include second UCIs of a same message type; or the plurality of second UCIs may include second UCIs of at least two different message types.

Furthermore, the combinations of the first UCI and the plurality of second UCIs include but not limited to the following examples.

Example 1: the first UCI is SR, and the plurality of second UCIs are HARQ-ACKs.

Example 2: the first UCI is SR, and the plurality of second UCIs are SPS HARQ-ACKs.

Example 3: the first UCI is SR, and the plurality of second UCIs are CSIs.

Example 4: the first UCI is SR, at least one of the plurality of second UCIs is CSI, and at least one of the plurality of second UCIs is HARQ-ACK.

Example 5: the first UCI is SR, at least one of the plurality of second UCIs is CSI, and at least one of the plurality of second UCIs is SPS HARQ-ACK.

Example 6: the first UCI is positive SR, and the plurality of second UCIs are HARQ-ACKs.

Example 7: the first UCI is positive SR, and the plurality of second UCIs are SPS HARQ-ACKs.

Example 8: the first UCI is positive SR, and the plurality of second UCIs are CSIs.

Example 9: the first UCI is positive SR, at least one of the plurality of second UCIs is CSI, and at least one of the plurality of second UCIs is HARQ-ACK.

Example 10: the first UCI is positive SR, at least one of the plurality of second UCIs is CSI, and at least one of the plurality of second UCIs is SPS HARQ-ACK.

Example 11: the first UCI is CSI, and the plurality of second UCIs are HARQ-ACKs.

Example 12: the first UCI is CSI, and the plurality of second UCIs are SPS HARQ-ACKs.

Example 13: the first UCI is CSI, at least one of the plurality of second UCIs is HARQ-ACK, and at least one of the plurality of second UCIs is SR.

Example 14: the first UCI is CSI, at least one of the plurality of second UCIs is HARQ-ACK, and at least one of the plurality of second UCIs is positive SR.

Example 15: the first UCI is CSI, at least one of the plurality of second UCIs is SPS HARQ-ACK, and at least one of the plurality of second UCIs is SR.

Example 16: the first UCI is CSI, at least one of the plurality of second UCIs is SPS HARQ-ACK, and at least one of the plurality of second UCIs is positive SR.

Example 17: the first UCI is HARQ-ACK, and the plurality of second UCIs are SRs.

Example 18: the first UCI is HARQ-ACK, and the plurality of second UCIs are positive SRs.

Example 19: the first UCI is HARQ-ACK, at least one of the plurality of second UCIs is CSI, and at least one of the plurality of second UCIs is SR.

Example 20: the first UCI is HARQ-ACK, at least one of the plurality of second UCIs is CSI, and at least one of the plurality of second UCIs is positive SR.

Example 21: the first UCI is SPS HARQ-ACK, and the plurality of second UCIs are SRs.

Example 22: the first UCI is SPS HARQ-ACK, and the plurality of second UCIs are positive SRs.

Example 23: the first UCI is SPS HARQ-ACK, at least one of the plurality of second UCIs is CSI, and at least one of the plurality of second UCIs is SR.

Example 24: the first UCI is SPS HARQ-ACK, at least one of the plurality of second UCIs is CSI, and at least one of the plurality of second UCIs is positive SR.

It should be noted that, before performing the step 502, the base station may further determine whether simultaneous transmission of the first UCI and the second UCIs is supported; and the base station selects a transmission resource of a second UCI among the transmission resources of the plurality of second UCIs according to the start position of the transmission resource of the first UCI and the start positions of the transmission resources of the second UCIs when the simultaneous transmission of the first UCI and the second UCIs is supported.

Step 503: the base station receives the first UCI and the second UCI carried by the selected transmission resource of the second UCI simultaneously on the selected transmission resource of the second UCI.

Since the UCI combined transmission process performed by the base station side corresponds to that performed by the user equipment side, it will not be repeated here.

Therefore, on the network side, for example, on the base station side, the above method can ensure that the base station and the user equipment have the same understanding of UCI combined transmission when the transmission resources of different UCIs overlap in the time domain; and the above method can also avoid the redundant transmission of the first UCI while ensuring that the base station can obtain the UCI timely.

The combined transmission method of the uplink control information will be described in detail below in combination with some embodiments.

First Embodiment

Figure 6:
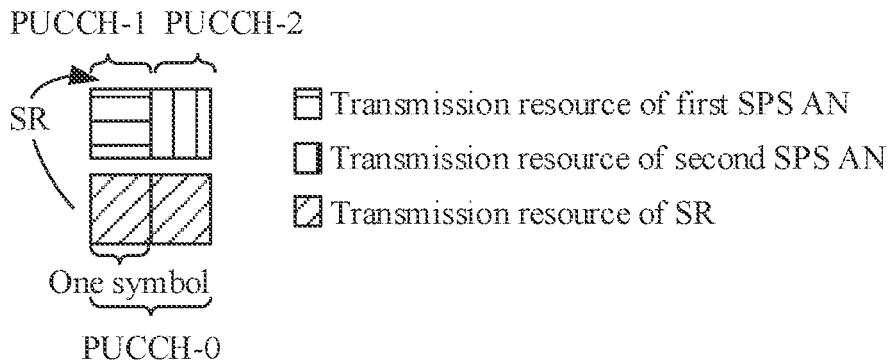
FIG. 6 is a schematic diagram provided by a first embodiment of the application.

As shown in FIG. 6, it is assumed that the first UCI is SR and transmitted using the PUCCH format 0, the transmission resource of the SR is PUCCH-0, which occupies 2 symbols. There are 2 second UCIs, both of which are SPS HARQ-ACKs (referred to as SPS ANs in FIG. 6) and transmitted using the PUCCH format 0, wherein the transmission resource of the first SPS HARQ-ACK is PUCCH-1 which occupies 1 symbol, and the transmission resource of the second SPS HARQ-ACK is PUCCH-2 which also occupies 1 symbol.

It can be seen from FIG. 6 that the start position of the transmission resource (PUCCH-0) of the SR is aligned with the start position of the transmission resource (PUCCH-1) of the first SPS HARQ-ACK, that is, the start position of the PUCCH-0 is no later than the start position of the PUCCH-1 and is earlier than the start position of the transmission resource (PUCCH-2) of the second SPS HARQ-ACK, so the SR and the first SPS HARQ-ACK can be transmitted on the PUCCH-1, and only the second SPS HARQ-ACK is transmitted on the PUCCH-2.

When the state of the SR is positive, the user equipment can transmit the positive SR and the first SPS HARQ-ACK on the PUCCH-1. Specifically, the user equipment may transmit the first SPS HARQ-ACK on the PUCCH-1 by using the cyclic shift corresponding to the positive SR state to implicitly express that the PUCCH-1 also carries the positive SR information.

When the state of the SR is negative, the user equipment can transmit the negative SR and the first SPS HARQ-ACK on the PUCCH-1. Specifically, the user equipment may transmit the first SPS HARQ-ACK on the PUCCH-1 by using the cyclic shift corresponding to the negative SR state to implicitly express that the PUCCH-1 also carries the negative SR information.

Correspondingly, when the network-side device encounters the situation described in FIG. 6, the method adopted is similar, and the details are not repeated here.

Second Embodiment

Figure 7A:
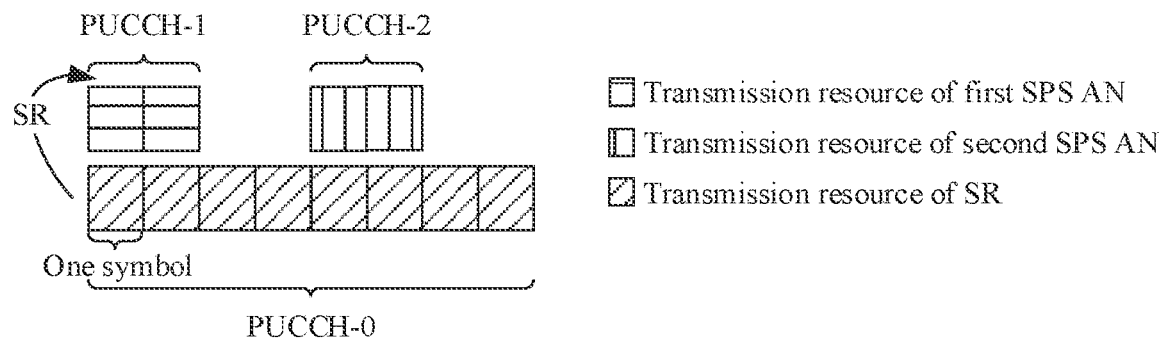
FIG. 7A is one of schematic diagrams according to a second embodiment of the application.
Figure 7B:
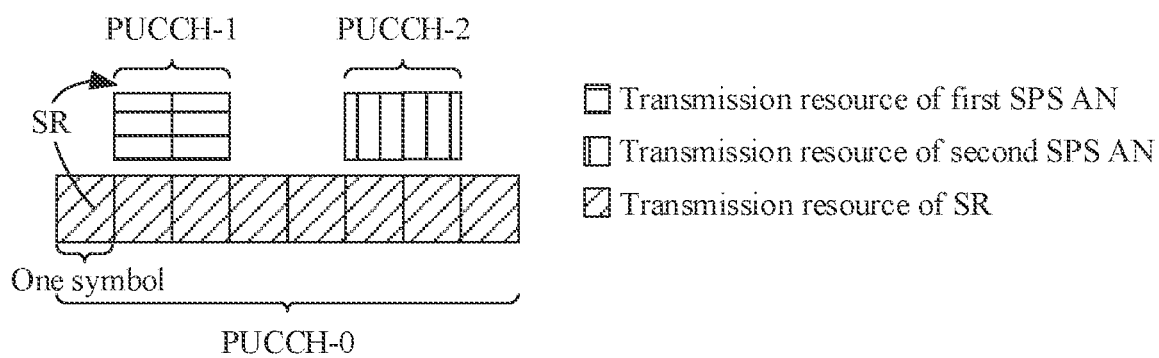
FIG. 7B is a second one of schematic diagrams according to the second embodiment of the application.
Figure 7C:
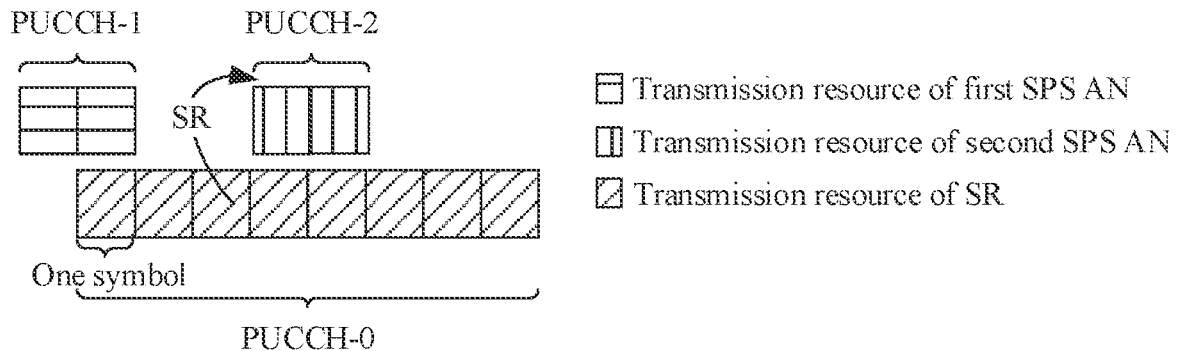
FIG. 7C is a third one of schematic diagrams according to the second embodiment of the application.

As shown in FIGS. 7A, 7B and 7C, it is assumed that the first UCI is SR and transmitted using the PUCCH format 1, the transmission resource of the SR is PUCCH-0, which occupies 8 symbols. There are 2 second UCIs, both of which are SPS HARQ-ACKs (referred to as SPS ANs in FIGS. 7A, 7B and 7C) and transmitted using the PUCCH format 0, wherein the transmission resource of the first SPS HARQ-ACK is PUCCH-1 which occupies 2 symbols, and the transmission resource of the second SPS HARQ-ACK is PUCCH-2 which also occupies 2 symbols.

It can be seen from FIG. 7A that the start position of the transmission resource (PUCCH-0) of the SR is aligned with the start position of the transmission resource (PUCCH-1) of the first SPS HARQ-ACK, that is, the start position of the PUCCH-0 is no later than the start position of the PUCCH-1 and is earlier than the start position of the transmission resource (PUCCH-2) of the second SPS HARQ-ACK, so the SR and the first SPS HARQ-ACK can be transmitted on the PUCCH-1, and only the second SPS HARQ-ACK is transmitted on the PUCCH-2.

When the state of the SR is positive, the user equipment can transmit the positive SR and the first SPS HARQ-ACK on the PUCCH-1. Specifically, the user equipment may transmit the first SPS HARQ-ACK on the PUCCH-1 by using the cyclic shift corresponding to the positive SR state to implicitly express that the PUCCH-1 also carries the positive SR information.

When the state of the SR is negative, the user equipment can transmit the negative SR and the first SPS HARQ-ACK on the PUCCH-1. Specifically, the user equipment may transmit the first SPS HARQ-ACK on the PUCCH-1 by using the cyclic shift corresponding to the negative SR state to implicitly express that the PUCCH-1 also carries the negative SR information.

It can be seen from FIG. 7B that the start position of the transmission resource (PUCCH-0) of the SR is earlier than the start position of the transmission resource (PUCCH-1) of the first SPS HARQ-ACK, and is earlier than the start position of the transmission resource (PUCCH-2) of the second SPS HARQ-ACK, so the SR and the first SPS HARQ-ACK can be transmitted on the PUCCH-1, and only the second SPS HARQ-ACK is transmitted on the PUCCH-2.

When the state of the SR is positive, the user equipment can transmit the positive SR and the first SPS HARQ-ACK on the PUCCH-1. Specifically, the user equipment may transmit the first SPS HARQ-ACK on the PUCCH-1 by using the cyclic shift corresponding to the positive SR state to implicitly express that the PUCCH-1 also carries the positive SR information.

When the state of the SR is negative, the user equipment can transmit the negative SR and the first SPS HARQ-ACK on the PUCCH-1. Specifically, the user equipment may transmit the first SPS HARQ-ACK on the PUCCH-1 by using the cyclic shift corresponding to the negative SR state to implicitly express that the PUCCH-1 also carries the negative SR information.

It can be seen from FIG. 7C that the start position of the transmission resource (PUCCH-0) of the SR is later than the start position of the transmission resource (PUCCH-1) of the first SPS HARQ-ACK, but is earlier than the start position of the transmission resource (PUCCH-2) of the second SPS HARQ-ACK, so the SR and the second SPS HARQ-ACK can be transmitted on the PUCCH-2, and only the first SPS HARQ-ACK is transmitted on the PUCCH-1.

When the state of the SR is positive, the user equipment can transmit the positive SR and the second SPS HARQ-ACK on the PUCCH-2. Specifically, the user equipment may transmit the second SPS HARQ-ACK on the PUCCH-2 by using the cyclic shift corresponding to the positive SR state to implicitly express that the PUCCH-1 also carries the positive SR information.

When the state of the SR is negative, the user equipment can transmit the negative SR and the second SPS HARQ-ACK on the PUCCH-2. Specifically, the user equipment may transmit the second SPS HARQ-ACK on the PUCCH-2 by using the cyclic shift corresponding to the negative SR state to implicitly express that the PUCCH-1 also carries the negative SR information.

Correspondingly, when the network-side device encounters the situation described in any one of FIGS. 7A, 7B and 7C, the method adopted is similar, and the details are not repeated here.

Third Embodiment

Figure 8A:
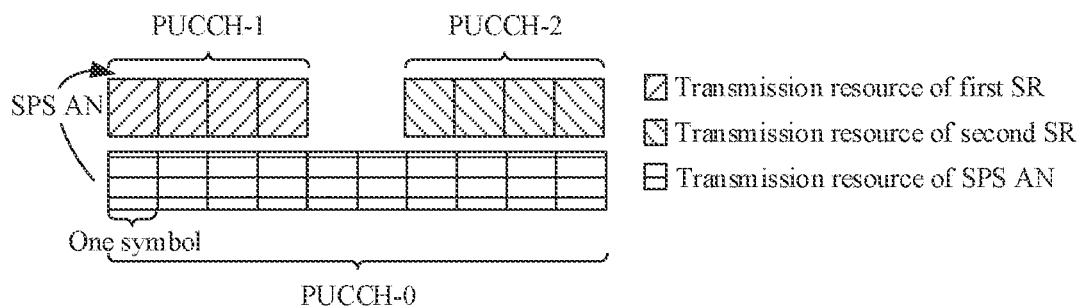
FIG. 8A is one of schematic diagrams according to a third embodiment of the application.
Figure 8B:
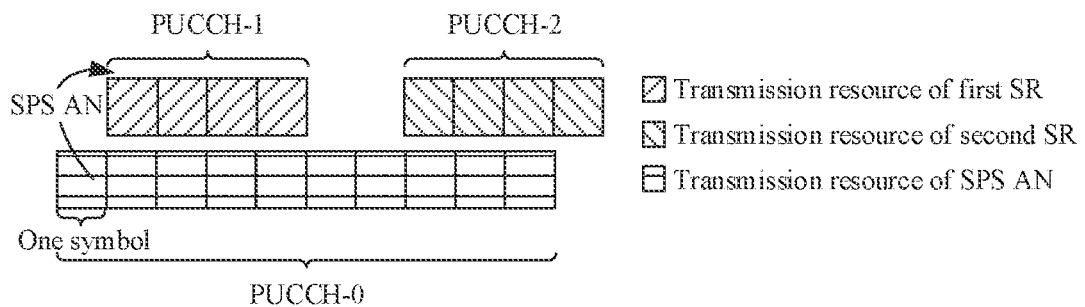
FIG. 8B is a second one of schematic diagrams according to the third embodiment of the application.
Figure 8C:
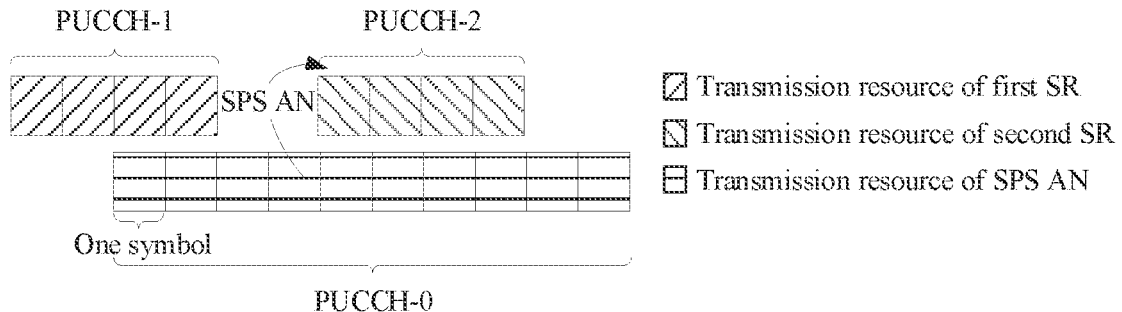
FIG. 8C is a third one of schematic diagrams according to the third embodiment of the application.

As shown in FIGS. 8A, 8B and 8C, it is assumed that the first UCI is SPS HARQ-ACK (referred to as SPS AN in FIGS. 8A, 8B and 8C) and transmitted using the PUCCH format 1, the transmission resource of the SPS HARQ-ACK is PUCCH-0, which occupies 10 symbols; there are 2 second UCIs, both of which are SRs and transmitted using the PUCCH format 1, wherein the transmission resource of the first SR is PUCCH-1 which occupies 4 symbols, and the transmission resource of the second SR is PUCCH-2 which also occupies 4 symbols.

It can be seen from FIG. 8A that the start position of the transmission resource (PUCCH-0) of the SPS HARQ-ACK is aligned with the start position of the transmission resource (PUCCH-1) of the first SR, that is, the start position of the PUCCH-0 is no later than the start position of the PUCCH-1 and is earlier than the start position of the transmission resource (PUCCH-2) of the second SR, so the SPS HARQ-ACK and the first SR can be transmitted on the PUCCH-1, and only the second SR is transmitted on the PUCCH-2.

When the states of the two SRs are both positive, the user equipment can transmit the SPS HARQ-ACK and the first positive SR on the PUCCH-1, that is, it implicitly express that the PUCCH-1 also carries the positive SR information by transmitting the SPS HARQ-ACK on the PUCCH-1; and only the second positive SR is transmitted on the PUCCH-2.

When the state of only one of the two SRs is positive, the user equipment can transmit through many methods. First method: the user equipment can transmit the SPS HARQ-ACK on the PUCCH resource corresponding to the positive SR to implicitly express that the resource also carries the positive SR information; and cannot transmit on the PUCCH resource corresponding to the negative SR. Second method: the user equipment can perform a timeline judgment on the overlapping combination of the PUCCH resource corresponding to the positive SR and the PUCCH resource of the SPS HARQ-ACK; when the earliest channel in the overlapping combination meets the timeline, the SPS HARQ-ACK and the positive SR are transmitted on the PUCCH resource corresponding to the positive SR, where the specific transmission process is the same as the first method; when the earliest channel in the overlapping combination does not meet the timeline, it is considered to be wrong scheduling, and the UE can autonomously choose how to transmit, and the specific behavior is not specified.

When the states of the two SRs are both negative, the user equipment can transmit the HARQ-ACK on the PUCCH resource (PUCCH-0) corresponding to the SPS HARQ-ACK to implicitly express the negative SR information.

It can be seen from FIG. 8B that the start position of the transmission resource (PUCCH-0) of the SPS HARQ-ACK is earlier than the start position of the transmission resource (PUCCH-1) of the first SR, and is earlier than the start position of the transmission resource (PUCCH-2) of the second SR, so the SPS HARQ-ACK and the first SR can be transmitted on the PUCCH-1, and only the second SR is transmitted on the PUCCH-2.

When the states of the two SRs are both positive, the user equipment can transmit the SPS HARQ-ACK and the first positive SR on the PUCCH-1, that is, implicitly express that the PUCCH-1 also carries the positive SR information by transmitting the SPS HARQ-ACK on the PUCCH-1; and only the second positive SR is transmitted on the PUCCH-2.

When the state of only one of the two SRs is positive, the user equipment can transmit through many methods. First method: the user equipment can transmit the SPS HARQ-ACK on the PUCCH resource corresponding to the positive SR to implicitly express that the resource also carries the positive SR information; and cannot transmit on the PUCCH resource corresponding to the negative SR. Second method: the user equipment can perform a timeline judgment on the overlapping combination of the PUCCH resource corresponding to the positive SR and the PUCCH resource of the SPS HARQ-ACK; when the earliest channel in the overlapping combination meets the timeline, the SPS HARQ-ACK and the positive SR are transmitted on the PUCCH resource corresponding to the positive SR, where the specific transmission process is the same as the first method; when the earliest channel in the overlapping combination does not meet the timeline, it is considered to be wrong scheduling, and the UE can autonomously choose how to transmit, and the specific behavior is not specified.

When the states of the two SRs are both negative, the user equipment can transmit the HARQ-ACK on the PUCCH resource (PUCCH-0) corresponding to the SPS HARQ-ACK to implicitly express the negative SR information.

It can be seen from FIG. 8C that the start position of the transmission resource (PUCCH-0) of the SPS HARQ-ACK is later than the start position of the transmission resource (PUCCH-1) of the first SR, but is earlier than the start position of the transmission resource (PUCCH-2) of the second SR, so the user equipment can transmit the SPS HARQ-ACK and the second SR on the PUCCH-2, and transmit only the first SR on the PUCCH-1.

When the states of the two SRs are both positive, the user equipment can transmit the SPS HARQ-ACK and the second positive SR on the PUCCH-2, that is, implicitly express that the PUCCH-2 also carries the positive SR information by transmitting the SPS HARQ-ACK on the PUCCH-2; and only the first positive SR is transmitted on the PUCCH-1.

When the state of only one of the two SRs is positive, the user equipment can transmit through many methods. First method: the user equipment can transmit the SPS HARQ-ACK on the PUCCH resource corresponding to the positive SR to implicitly express that the resource also carries the positive SR information; and cannot transmit on the PUCCH resource corresponding to the negative SR. Second method: the user equipment can perform a timeline judgment on the overlapping combination of the PUCCH resource corresponding to the positive SR and the PUCCH resource of the SPS HARQ-ACK; when the earliest channel in the overlapping combination meets the timeline, the SPS HARQ-ACK and the positive SR are transmitted on the PUCCH resource corresponding to the positive SR, where the specific transmission process is the same as the first method; when the earliest channel in the overlapping combination does not meet the timeline, it is considered to be wrong scheduling, and the UE can autonomously choose how to transmit, and the specific behavior is not specified.

When the states of the two SRs are both negative, the user equipment can transmit the HARQ-ACK on the PUCCH resource (PUCCH-0) corresponding to the SPS HARQ-ACK to implicitly express the negative SR information.

Correspondingly, when the network-side device encounters the situation described in any one of FIGS. 8A, 8B and 8C, the method adopted is similar, and the details are not repeated here.

Fourth Embodiment

Figure 9A:
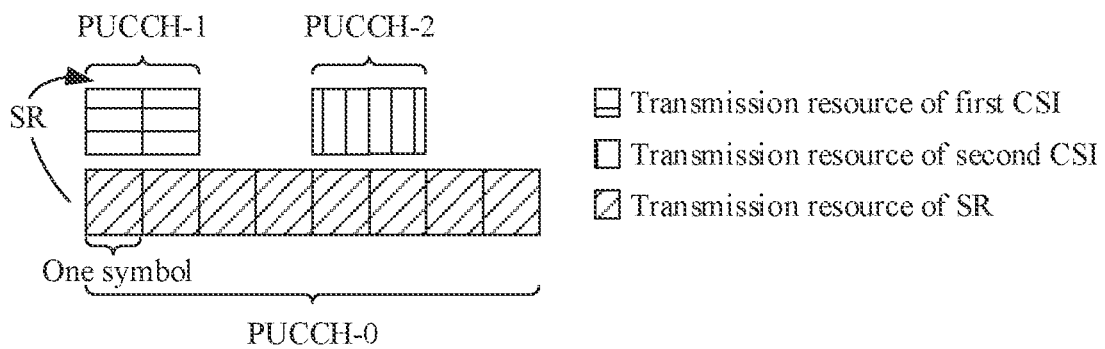
FIG. 9A is one of schematic diagrams according to a fourth embodiment of the application.
Figure 9B:
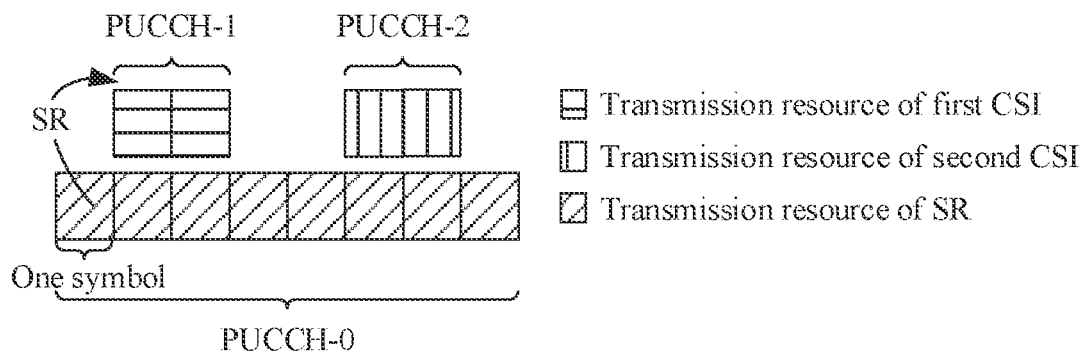
FIG. 9B is a second one of schematic diagrams according to the fourth embodiment of the application.
Figure 9C:
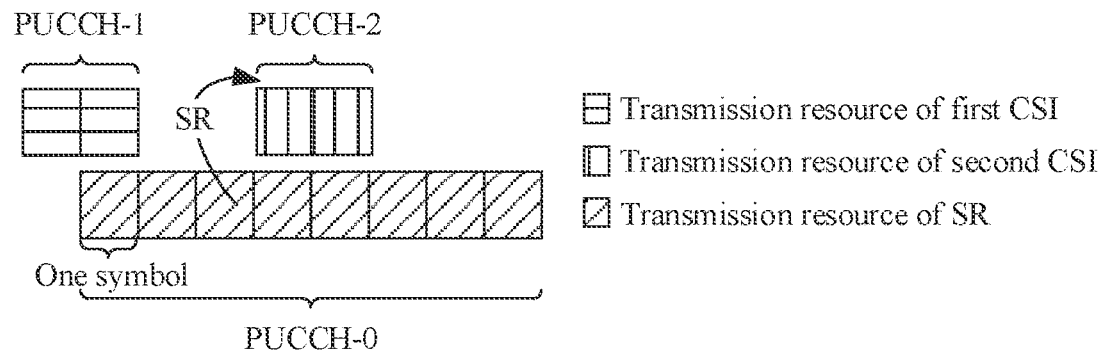
FIG. 9C is a third one of schematic diagrams according to the fourth embodiment of the application.

As shown in FIGS. 9A, 9B and 9C, it is assumed that the first UCI is SR and transmitted using the PUCCH format 1, the transmission resource of the SR is PUCCH-0, which occupies 8 symbols; there are 2 second UCIs, both of which are CSIs and transmitted using the PUCCH format 2, wherein the transmission resource of the first CSI is PUCCH-1 which occupies 2 symbols, and the transmission resource of the second CSI is PUCCH-2 which also occupies 2 symbols.

It can be seen from FIG. 9A that the start position of the transmission resource (PUCCH-0) of the SR is aligned with the start position of the transmission resource (PUCCH-1) of the first CSI, that is, the start position of the PUCCH-0 is no later than the start position of the PUCCH-1 and is earlier than the start position of the transmission resource (PUCCH-2) of the second CSI, so the SR and the first CSI can be transmitted on the PUCCH-1, and only the second CSI is transmitted on the PUCCH-2.

Further, the user equipment may transmit the X-bit SR and the first CSI simultaneously on the PUCCH resource (PUCCH-1) corresponding to the first CSI, wherein X is $\lceil \log_2(K+1) \rceil$, and K is the number of overlapped SR configurations in the time domain, that is, regardless of whether the state of the SR is positive or negative, the user equipment needs to transmit the X-bit SR; and furthermore, when there is only one SR configuration, X=1.

It can be seen from FIG. 9B that the start position of the transmission resource (PUCCH-0) of the SR is earlier than the start position of the transmission resource (PUCCH-1) of the first CSI, and is earlier than the start position of the transmission resource (PUCCH-2) of the second CSI, so the user equipment can transmit the SR and the first CSI on the PUCCH-1, and transmit only the second CSI on the PUCCH-2. The specific transmission method can refer to the content described above, and will not be repeated here.

It can be seen from FIG. 9C that the start position of the transmission resource (PUCCH-0) of the SR is later than the start position of the transmission resource (PUCCH-1) of the first CSI, but is earlier than the start position of the transmission resource (PUCCH-2) of the second CSI, so the user equipment can transmit the SR and the second CSI on the PUCCH-2, and transmit only the first CSI on the PUCCH-1.

Further, the user equipment may transmit the X-bit SR and the second CSI simultaneously on the PUCCH resource (PUCCH-2) corresponding to the second CSI, wherein X is $\lceil \log_2(K+1) \rceil$, and K is the number of overlapped SR configurations in the time domain, that is, regardless of whether the state of the SR is positive or negative, the user equipment needs to transmit the X-bit SR; and furthermore, when there is only one SR configuration, X=1.

Correspondingly, when the network-side device encounters the situation described in any one of FIGS. 9A, 9B and 9C, the method adopted is similar, and the details are not repeated here.

Figure 10:
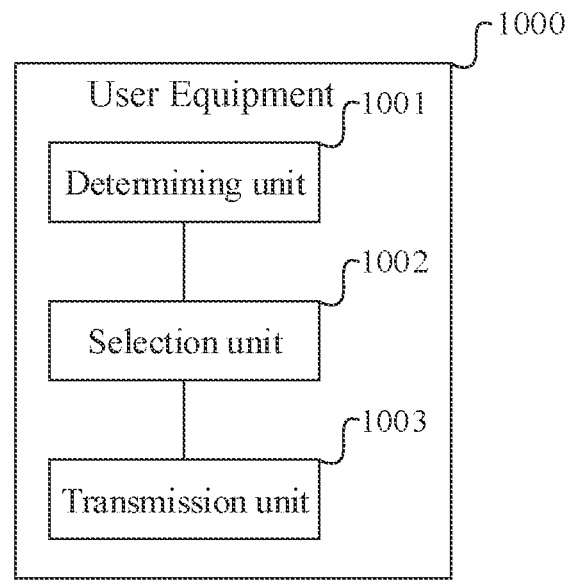
FIG. 10 is a schematic structural diagram of a user equipment according to an embodiment of the application.

Based on the same technical concept, an embodiment of the application further provides a user equipment, which can perform the foregoing method embodiments. The user equipment according to the embodiment of the application is as shown in FIG. 10, and the user equipment 1000 includes:

a determining unit 1001, a selection unit 1002, and a transmission unit 1003, wherein:

the determining unit 1001 is configured to determine that a transmission resource of a first UCI and transmission resources of a plurality of second UCIs overlap in a time domain, and transmission resources of any two of the plurality of second UCIs do not overlap in the time domain;

the selection unit 1002 is configured to select a transmission resource of a second UCI among the transmission resources of the plurality of second UCIs according to the start position of the transmission resource of the first UCI and the start positions of the transmission resources of the second UCIs;

the transmission unit 1003 is configured to transmit the first UCI and the second UCI carried by the selected transmission resource of the second UCI simultaneously on the selected transmission resource of the second UCI.

In a possible implementation, the selection unit 1002 is configured to: when it is determined that the start position of the transmission resource of the first UCI is not later than the start position of a transmission resource of any second UCI or a first second UCI or a second UCI with the earliest start position among the transmission resources of the plurality of second UCIs, determine the transmission resource of the first second UCI or the second UCI with the earliest start position among the transmission resources of the plurality of second UCIs as the selected transmission resource of the second UCI.

In a possible implementation, the selection unit 1002 is configured to: when it is determined that the start position of the transmission resource of the first UCI is later than the start position of the transmission resource of a first second UCI or a second UCI with the earliest start position among the transmission resources of the plurality of second UCIs, determine the transmission resource of a second or last second UCI or a second UCI with the second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: HARQ-ACK, CSI and SR.

In a possible implementation, the first UCI is SR, and the plurality of second UCIs are HARQ-ACKs; or the first UCI is SR, and the plurality of second UCIs are SPS HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, before selecting the transmission resource of a second UCI among the transmission resources of the plurality of second UCIs according to the start position of the transmission resource of the first UCI and the start positions of the transmission resources of the second UCIs, the selection unit 1002 is further configured to: determine whether simultaneous transmission of the first UCI and the second UCI is supported; and select the transmission resource of a second UCI among the transmission resources of the plurality of second UCIs according to the start position of the transmission resource of the first UCI and the start positions of the transmission resources of the second UCIs when the simultaneous transmission of the first UCI and the second UCI is supported.

Figure 11:
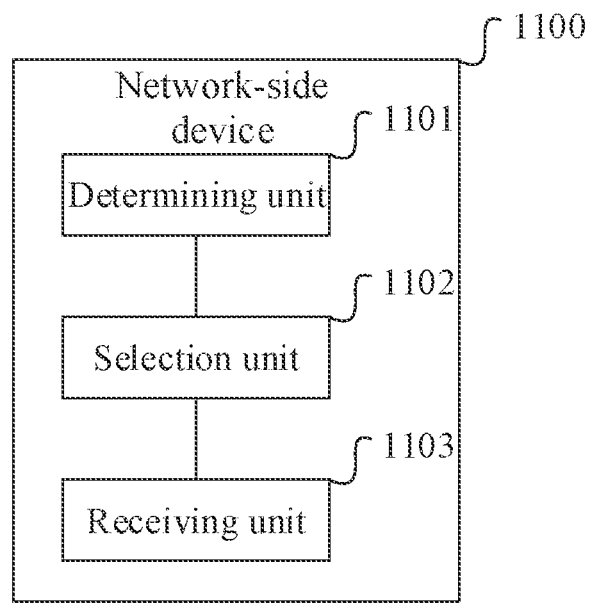
FIG. 11 is a schematic structural diagram of a network-side device according to an embodiment of the application.

Based on the same application concept, an embodiment of the application further provides a network-side device, which may be a base station. The processing steps performed by the network-side device correspond to the steps of the network-side method described above. The network-side device provided by the embodiment of the application is as shown in FIG. 11, and the network-side device 1100 includes: a determining unit 1101, a selection unit 1102, and a receiving unit 1103, wherein:

the determining unit 1101 is configured to determine that a transmission resource of a first UCI and transmission resources of a plurality of second UCIs overlap in a time domain, and transmission resources of any two of the plurality of second UCIs do not overlap in the time domain;

the selection unit 1102 is configured to select a transmission resource of a second UCI among the transmission resources of the plurality of second UCIs according to the start position of the transmission resource of the first UCI and the start positions of the transmission resources of the second UCIs;

the receiving unit 1103 is configured to receive the first UCI and the second UCI carried by the selected transmission resource of the second UCI simultaneously on the selected transmission resource of the second UCI.

In a possible implementation, the selection unit 1102 is configured to: when it is determined that the start position of the transmission resource of the first UCI is not later than the start position of the transmission resource of any second UCI or a first second UCI or a second UCI with the earliest start position among the transmission resources of the plurality of second UCIs, determine the transmission resource of the first second UCI or the second UCI with the earliest start position among the transmission resources of the plurality of second UCIs as the selected transmission resource of the second UCI.

In a possible implementation, the selection unit 1102 is configured to: when it is determined that the start position of the transmission resource of the first UCI is later than the start position of the transmission resource of a first second UCI or a second UCI with the earliest start position among the transmission resources of the plurality of second UCIs, determine the transmission resource of a second or last second UCI or a second UCI with the second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: HARQ-ACK, periodic CSI and SR.

In a possible implementation, the first UCI is SR, and the plurality of second UCIs are HARQ-ACKs; or the first UCI is SR, and the plurality of second UCIs are SPS HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, before selecting the transmission resource of a second UCI among the transmission resources of the plurality of second UCIs according to the start position of the transmission resource of the first UCI and the start positions of the transmission resources of the second UCIs, the selection unit 1102 is further configured to: determine whether simultaneous transmission of the first UCI and the second UCI is supported; and select the transmission resource of the second UCI among the transmission resources of the plurality of second UCIs according to the start position of the transmission resource of the first UCI and the start positions of the transmission resources of the second UCIs when the simultaneous transmission of the first UCI and the second UCI is supported.

Figure 12:
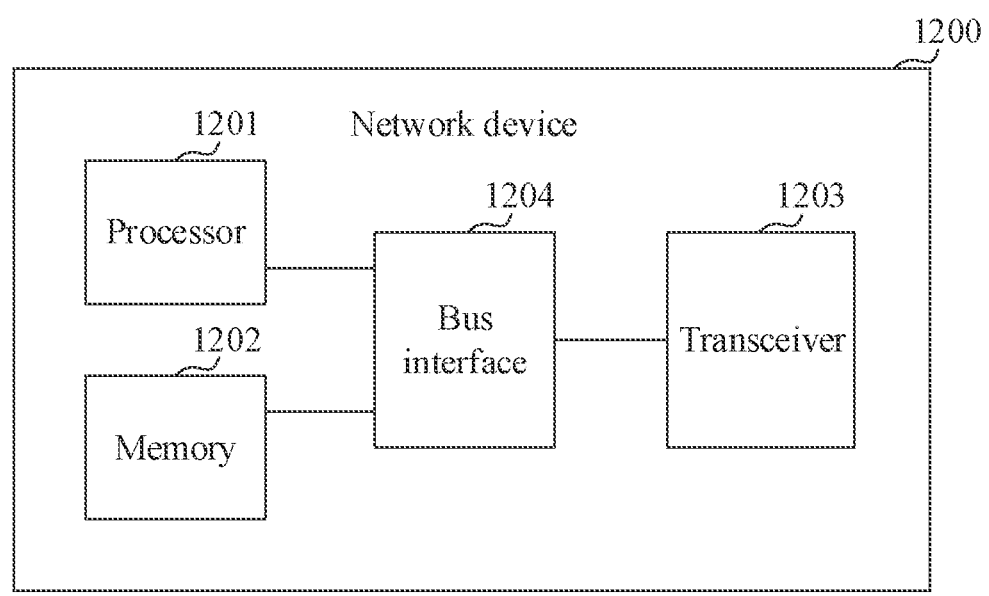
FIG. 12 is a schematic structural diagram of a network device according to an embodiment of the application.

Based on the same technical concept, an embodiment of the application provides a network device. As shown in FIG. 12, the network device may be a user equipment or a network-side device (such as base station), and the network device 1200 includes:

a processor 1201, a memory 1202, a transceiver 1203, and a bus interface 1204, wherein the processor 1201, the memory 1202 and the transceiver 1203 are connected through the bus interface 1204.

When the network device is a user equipment, the processor 1201 is configured to determine that a transmission resource of a first UCI and transmission resources of a plurality of second UCIs overlap in the time domain, and transmission resources of any two of the plurality of second UCIs do not overlap in the time domain; and select a transmission resource of a second UCI among the transmission resources of the plurality of second UCIs according to the start position of the transmission resource of the first UCI and the start positions of the transmission resources of the plurality of second UCIs; the memory 1202 is configured to store one or more executable programs, and store data used by the processor when performing operations; the transceiver 1203 is configured to transmit the first UCI and the second UCI carried by the selected transmission resource of the second UCI simultaneously on the selected transmission resource of the second UCI; and the bus interface 1204 is configured to provide an interface.

In a possible implementation, the processor 1201 is configured to: when it is determined that the start position of the transmission resource of the first UCI is not later than the start position of the transmission resource of any second UCI or a first second UCI or a second UCI with the earliest start position among the transmission resources of the plurality of second UCIs, determine the transmission resource of the first second UCI or the second UCI with the earliest start position among the transmission resources of the plurality of second UCIs as the selected transmission resource of the second UCI.

In a possible implementation, the processor 1201 is configured to: when it is determined that the start position of the transmission resource of the first UCI is later than the start position of the transmission resource of a first second UCI or a second UCI with the earliest start position among the transmission resources of the plurality of second UCIs, determine the transmission resource of a second or last second UCI or a second UCI with the second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: HARQ-ACK, periodic CSI and SR.

In a possible implementation, the first UCI is SR, and the plurality of second UCIs are HARQ-ACKs; or the first UCI is SR, and the plurality of second UCIs are SPS HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, the processor 1201 is further configured to: determine whether simultaneous transmission of the first UCI and the second UCI is supported; and select the transmission resource of the second UCI among the transmission resources of the plurality of second UCIs according to the start position of the transmission resource of the first UCI and the start positions of the transmission resources of the second UCIs when the simultaneous transmission of the first UCI and the second UCI is supported.

When the network device is a network-side device (such as base station), the processor 1201 is configured to determine that a transmission resource of a first UCI and transmission resources of a plurality of second UCIs overlap in the time domain, and transmission resources of any two of the plurality of second UCIs do not overlap in the time domain; and select a transmission resource of a second UCI among the transmission resources of the plurality of second UCIs according to the start positions of the transmission resources of the first UCI and the start position of the transmission resources of the plurality of second UCIs.

The memory 1202 is configured to store one or more executable programs, and store data used by the processor when performing operations.

The transceiver 1203 is configured to receive the first UCI and the second UCI carried by the selected transmission resource of the second UCI simultaneously on the selected transmission resource of the second UCI.

The bus interface 1204 is configured to provide an interface.

In a possible implementation, the processor 1201 is configured to: when it is determined that the start position of the transmission resource of the first UCI is not later than the start position of the transmission resource of any second UCI or a first second UCI or a second UCI with the earliest start position among the transmission resources of the plurality of second UCIs, determine the transmission resource of the first second UCI or the second UCI with the earliest start position among the transmission resources of the plurality of second UCIs as the selected transmission resource of the second UCI.

In a possible implementation, the processor 1201 is configured to: when it is determined that the start position of the transmission resource of the first UCI is later than the start position of the transmission resource of a first second UCI or a second UCI with the earliest start position among the transmission resources of the plurality of second UCIs, determine the transmission resource of a second or last second UCI or a second UCI with the second earliest start position among the transmission resources of the plurality of second UCIs as the selected transmission resource of the second UCI.

In a possible implementation, the plurality of second UCIs include second UCIs of a same message type; or the plurality of second UCIs include second UCIs of at least two different message types.

In a possible implementation, the first UCI and the plurality of second UCIs are any one of: HARQ-ACK, periodic CSI and SR.

In a possible implementation, the first UCI is SR, and the plurality of second UCIs are HARQ-ACKs; or the first UCI is SR, and the plurality of second UCIs are SPS HARQ-ACKs; or the first UCI is SR, and the plurality of second UCIs are CSIs; or the first UCI is SR, at least one of the plurality of second UCIs is CSI, and at least one of the plurality of second UCIs is HARQ-ACK; or the first UCI is SR, at least one of the plurality of second UCIs is CSI, and at least one of the plurality of second UCIs is SPS HARQ-ACK; or the first UCI is positive SR, and the plurality of second UCIs are HARQ-ACKs; or the first UCI is positive SR, and the plurality of second UCIs are SPS HARQ-ACKs; or the first UCI is positive SR, and the plurality of second UCIs are CSIs; or the first UCI is positive SR, at least one of the plurality of second UCIs is CSI, and at least one of the plurality of second UCIs is HARQ-ACK; or the first UCI is positive SR, at least one of the plurality of second UCIs is CSI, and at least one of the plurality of second UCIs is SPS HARQ-ACK; or the first UCI is CSI, and the plurality of second UCIs are HARQ-ACKs; or the first UCI is CSI, and the plurality of second UCIs are SPS HARQ-ACKs; or the first UCI is CSI, at least one of the plurality of second UCIs is HARQ-ACK, and at least one of the plurality of second UCIs is SR; or the first UCI is CSI, at least one of the plurality of second UCIs is HARQ-ACK, and at least one of the plurality of second UCIs is positive SR; or the first UCI is CSI, at least one of the plurality of second UCIs is SPS HARQ-ACK, and at least one of the plurality of second UCIs is SR; or the first UCI is CSI, at least one of the plurality of second UCIs is SPS HARQ-ACK, and at least one of the plurality of second UCIs is positive SR; or the first UCI is HARQ-ACK, and the plurality of second UCIs are SRs; or the first UCI is HARQ-ACK, and the plurality of second UCIs are positive SRs; or the first UCI is HARQ-ACK, at least one of the plurality of second UCIs is CSI, and at least one of the plurality of second UCIs is SR; or the first UCI is HARQ-ACK, at least one of the plurality of second UCIs is CSI, and at least one of the plurality of second UCIs is positive SR; or the first UCI is SPS HARQ-ACK, and the plurality of second UCIs are SRs; or the first UCI is SPS HARQ-ACK, and the plurality of second UCIs are positive SRs; or the first UCI is SPS HARQ-ACK, at least one of the plurality of second UCIs is CSI, and at least one of the plurality of second UCIs is SR; or the first UCI is SPS HARQ-ACK, at least one of the plurality of second UCIs is CSI, and at least one of the plurality of second UCIs is positive SR.

In a possible implementation, the transmission resource is PUCCH resource.

In a possible implementation, the processor 1201 is further configured to: determine whether simultaneous transmission of the first UCI and the second UCI is supported; and select the transmission resource of a second UCI among the transmission resources of the plurality of second UCIs according to the start position of the transmission resource of the first UCI and the start positions of the transmission resources of the second UCIs when the simultaneous transmission of the first UCI and the second UCI is supported.

In summary, in the embodiments of the application, when the transmission resources of a plurality of second UCIs and the transmission resource of the first UCI overlap in the time domain, the user equipment can select the transmission resource of a second UCI among the transmission resources of the plurality of second UCIs according to the start position of the transmission resource of the first UCI and the start positions of the transmission resources of the second UCIs, and then transmit the first UCI and the second UCI carried by the selected transmission resource of the second UCI simultaneously on the selected transmission resource of the second UCI. Correspondingly, the network side can also use the same method to receive the first UCI and the second UCI carried by the selected transmission resource of the second UCI simultaneously on the selected transmission resource of the second UCI. The above method can ensure that the base station and the user equipment have the same understanding of UCI combined transmission when the transmission resources of different UCIs overlap in the time domain; and the above method can also avoid the redundant transmission of the first UCI while ensuring that the base station can obtain the UCI timely.

It should be understood by those skilled in the art that the embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, CD-ROMs, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the application.

Evidently those skilled in the art can make various modifications and variations to the application without departing from the spirit and scope of the application. Thus the application is also intended to encompass these modifications and variations therein as long as these modifications and variations to the application come into the scope of the claims of the application and their equivalents.

What is claimed is:

1. An Uplink Control Information, UCI, combined transmission method, comprising:

determining, by a user equipment, that a transmission resource of a first UCI and transmission resources of a plurality of second UCIs overlap in a time domain; wherein the first UCI and the plurality of second UCIs are any one of: Hybrid Automatic Repeat reQuest-Acknowledgement, HARQ-ACK; periodic Channel State Information, CSI; and Scheduling Request, SR;

multiplexing, by the user equipment, the first UCI and the second UCI simultaneously transmitted on a selected transmission resource of a second UCI selected from the transmission resources of the plurality of the second UCIs, wherein the second UCI is carried by the selected transmission resource of the second UCI.

2. The method according to claim 1, wherein transmission resources of any two of the plurality of second UCIs do not overlap in the time domain.

3. The method according to claim 1, wherein before the multiplexing, the method further comprises:

selecting, by the user equipment, a transmission resource of a second UCI among the transmission resources of the plurality of second UCIs according to a start position of the transmission resource of the first UCI and start positions of the transmission resources of the plurality of second UCIs.

4. The method according to claim 3, wherein selecting, by the user equipment, the transmission resource of the second UCI among the transmission resources of the plurality of second UCIs according to the start position of the transmission resource of the first UCI and start positions of the transmission resources of the plurality of second UCIs, comprises:

when the user equipment determines that the start position of the transmission resource of the first UCI is not later than a start position of a transmission resource of any second UCI or a first second UCI or a second UCI with an earliest start position among the transmission resources of the plurality of second UCIs, determining the transmission resource of the first second UCI or the second UCI with the earliest start position among the transmission resources of the plurality of second UCIs as the selected transmission resource of the second UCI.

5. The method according to claim 3, wherein selecting, by the user equipment, the transmission resource of the second UCI among the transmission resources of the plurality of second UCIs according to the start position of the transmission resource of the first UCI and the start positions of the transmission resources of the plurality of second UCIs, comprises:

when the user equipment determines that the start position of the transmission resource of the first UCI is later than a start position of a transmission resource of a first second UCI or a second UCI with an earliest start position among the transmission resources of the plurality of second UCIs, determining a transmission resource of a second or last second UCI or a second UCI with a second earliest start position among the transmission resources of the plurality of second UCIs as the selected transmission resource of the second UCI.

6. The method according to claim 3, wherein before the user equipment selects the transmission resource of the second UCI among the transmission resources of the plurality of second UCIs according to the start position of the transmission resource of the first UCI and the start positions of the transmission resources of the second UCIs, the method further comprises:

determining, by the user equipment, whether simultaneous transmission of the first UCI and the second UCI is supported;

selecting, by the user equipment, the transmission resource of the second UCI among the transmission resources of the plurality of second UCIs according to the start position of the transmission resource of the first UCI and the start positions of the transmission resources of the second UCIs, comprises:

selecting, by the user equipment, the transmission resource of the second UCI among the transmission resources of the plurality of second UCIs according to the start position of the transmission resource of the first UCI and start positions of the transmission resources of the second UCIs when the simultaneous transmission of the first UCI and the second UCI is supported.

7. An Uplink Control Information, UCI, combined transmission method, comprising:

determining, by a network-side device, that a transmission resource of a first UCI and transmission resources of a plurality of second UCIs overlap in a time domain; wherein the first UCI and the plurality of second UCIs are any one of: Hybrid Automatic Repeat reQuest-Acknowledgement, HARQ-ACK; periodic Channel State Information, CSI; and Scheduling Request, SR;

multiplexing, by the network-side device, the first UCI and the second UCI simultaneously received on a selected transmission resource of a second UCI selected from the transmission resources of the plurality of second UCIs, wherein the second UCI is carried by the selected transmission resource of the second UCI.

8. The method according to claim 7, wherein before the multiplexing, the method further comprises:

selecting, by the network-side device, a transmission resource of a second UCI among the transmission resources of the plurality of second UCIs according to a start position of the transmission resource of the first UCI and start positions of the transmission resources of the plurality of second UCIs.

9. The method according to claim 8, wherein selecting, by the network-side device, the transmission resource of a second UCI among the transmission resources of the plurality of second UCIs according to the start position of the transmission resource of the first UCI and start positions of the transmission resources of the plurality of second UCIs, comprises:

when the network-side device determines that the start position of the transmission resource of the first UCI is not later than a start position of a transmission resource of any second UCI or a first second UCI or a second UCI with an earliest start position among the transmission resources of the plurality of second UCIs, determining the transmission resource of the first second UCI or the second UCI with the earliest start position among the transmission resources of the plurality of second UCIs as the selected transmission resource of the second UCI.

10. The method according to claim 8, wherein selecting, by the network-side device, the transmission resource of the second UCI among the transmission resources of the plurality of second UCIs according to the start position of the transmission resource of the first UCI and start positions of the transmission resources of the plurality of second UCIs, comprises:

when the network-side device determines that the start position of the transmission resource of the first UCI is later than a start position of a transmission resource of a first second UCI or a second UCI with an earliest start position among the transmission resources of the plurality of second UCIs, determining a transmission resource of a second or last second UCI or a second UCI with a second earliest start position among the transmission resources of the plurality of second UCIs as the selected transmission resource of the second UCI.

11. The method according to claim 8, wherein before the network-side device selects the transmission resource of the second UCI among the transmission resources of the plurality of second UCIs according to the start position of the transmission resource of the first UCI and the start positions of the transmission resources of the second UCIs, the method further comprises:
  determining, by the network-side device, whether simultaneous transmission of the first UCI and the second UCI is supported;
  selecting, by the network-side device, the transmission resource of the second UCI among the transmission resources of the plurality of second UCIs according to the start position of the transmission resource of the first UCI and the start positions of the transmission resources of the second UCIs, comprises:
  selecting, by the network-side device, the transmission resource of the second UCI among the transmission resources of the plurality of second UCIs according to the start position of the transmission resource of the first UCI and the start positions of the transmission resources of the second UCIs when the simultaneous transmission of the first UCI and the second UCI is supported.

12. A user equipment, comprising: a processor, a memory and a transceiver; the processor is configured to read computer instructions in the memory to:
  determine that a transmission resource of a first UCI and transmission resources of a plurality of second UCIs overlap in a time domain; wherein the first UCI and the plurality of second UCIs are any one of: Hybrid Automatic Repeat reQuest-Acknowledgement, HARQ-ACK; periodic Channel State Information, CSI; and Scheduling Request, SR;
  multiplex the first UCI and the second UCI simultaneously transmitted on a selected transmission resource of a second UCI selected from the transmission resources of the plurality of second UCIs via the transceiver, wherein the second UCI is carried by the selected transmission resource of the second UCI.

13. The user equipment according to claim 12, wherein transmission resources of any two of the plurality of second UCIs do not overlap in the time domain.

14. The user equipment according to claim 12, wherein the processor is configured to: before multiplexing the first UCI and the second UCI simultaneously transmitted on a selected transmission resource of a second UCI selected from the transmission resources of the plurality of second UCIs,
  select a transmission resource of a second UCI among the transmission resources of the plurality of second UCIs according to a start position of the transmission resource of the first UCI and start positions of the transmission resources of the plurality of second UCIs.

15. The user equipment according to claim 14, wherein the processor is configured to:
  when it is determined that the start position of the transmission resource of the first UCI is not later than a start position of a transmission resource of any second UCI or a first second UCI or a second UCI with an earliest start position among the transmission resources of the plurality of second UCIs, determine the transmission resource of the first second UCI or the second UCI with the earliest start position among the transmission resources of the plurality of second UCIs as the selected transmission resource of the second UCI.

16. The user equipment according to claim 14, wherein the processor is configured to:
  when it is determined that the start position of the transmission resource of the first UCI is later than a start position of a transmission resource of a first second UCI or a second UCI with an earliest start position among the transmission resources of the plurality of second UCIs, determine a transmission resource of a second or last second UCI or a second UCI with a second earliest start position among the transmission resources of the plurality of second UCIs as the selected transmission resource of the second UCI.

17. The user equipment according to claim 14, wherein the processor is configured to:
  determine whether simultaneous transmission of the first UCI and the second UCI is supported before selecting the transmission resource of the second UCI among the transmission resources of the plurality of second UCIs according to the start position of the transmission resource of the first UCI and the start positions of the transmission resources of the second UCIs;
  select the transmission resource of the second UCI among the transmission resources of the plurality of second UCIs according to the start position of the transmission resource of the first UCI and the start positions of the transmission resources of the second UCI when the simultaneous transmission of the first UCI and the second UCI is supported.

18. A network device, comprising: a processor, a memory and a transceiver; the processor is configured to read computer instructions in the memory to implement the method of claim 7.

19. The network device according to claim 18, wherein transmission resources of any two of the plurality of second UCIs do not overlap in the time domain.

20. The network device according to claim 18, wherein the processor is configured to: before multiplexing the first UCI and the second UCI simultaneously received on a selected transmission resource of a second UCI selected from the transmission resources of the plurality of second UCIs,
  select a transmission resource of a second UCI among the transmission resources of the plurality of second UCIs according to a start position of the transmission resource of the first UCI and start positions of the transmission resources of the plurality of second UCIs.

* * * * *